United States Patent

Hester, Jr.

[15] 3,681,343
[45] Aug. 1, 1972

[54] 6-PHENYL-S-TRIAZOLO[4,3-A][1,4] BENZODIAZEPINES

[72] Inventor: Jackson B. Hester, Jr., Galesburg, Mich.

[73] Assignee: The Upjohn Company, Kalamazoo, Mich.

[22] Filed: May 11, 1971

[21] Appl. No.: 142,418

[52] U.S. Cl. ...260/239.3 T, 260/308 R, 260/293.59, 424/273, 424/267
[51] Int. Cl. ............................................C07d 53/06
[58] Field of Search....................260/239.3 T, 308 R

[56] References Cited

UNITED STATES PATENTS 3,558,606   1/1971   Tinney ..................260/239.3 T

*Primary Examiner*—Henry B. Jiles
*Assistant Examiner*—Robert T. Bond
*Attorney*—John Kekich and Willard L. Cheesman

[57] ABSTRACT

This invention relates to novel 6-phenyl-s-triazolo [4,3-a][1,4]benzodiazepines embraced by the formulas

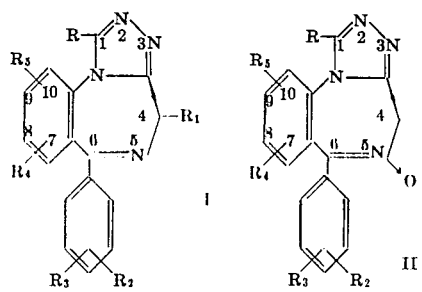

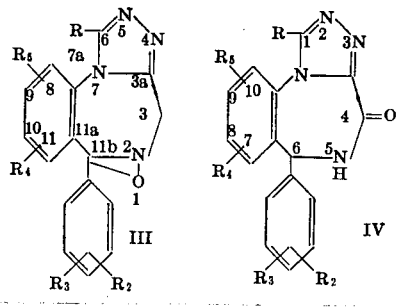

wherein R is selected from the group consisting of hydrogen, lower alkyl of one through three carbon atoms, phenyl, benzyl, nitromethyl, cyanomethyl, lower alkoxymethyl having an alkoxy moiety of one through three carbon atoms

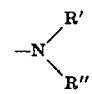

in which $n$ is an integer of 1 through 2, $R'$ and $R''$ are each selected from the group consisting of hydrogen and alkyl of one through three carbon atoms and when combined is an alkylidene bridge of four through five carbon atoms; $R_1$ is selected from the group consisting of hydroxy and lower acyloxy; $R_2$, $R_3$, $R_4$ and $R_5$ are selected from the group consisting of hydrogen, lower alkyl of one through three carbon atoms, halogen, nitro, cyano, trifluoromethyl, lower alkoxy, lower alkylthio, lower alkylsulfinyl, lower alkylsulfonyl, amino, lower alkanoylamino and lower dialkylamino; and a pharmacologically acceptable acid addition sat thereof. It also relates to novel processes for the preparation of the aforesaid compounds. The new products of Formulas I, II, III and IV are useful as sedatives, hypnotics, tranquilizers, muscle relaxants and anticonvulsants. Also, as feed additives for increasing growth rate and feed efficiency of livestock.

6 Claims, No Drawings

6-PHENYL-S-TRIAZOLO[4,3-A][1,4]BENZODIAZEPINES

BRIEF SUMMARY OF THE INVENTION

The novel 6-phenyl-s-triazolo[4,3-a][1,4]benzodiazepines of this invention are included within the generic formulas

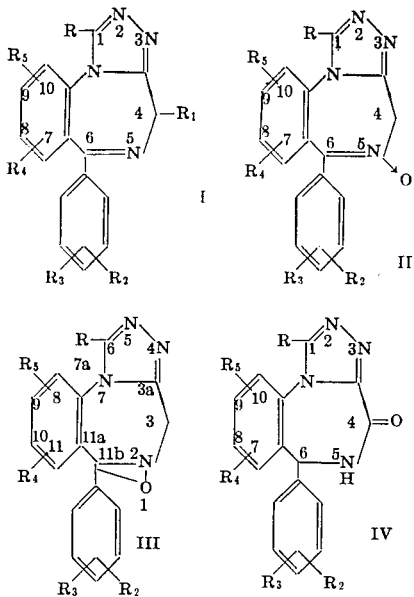

wherein R is selected from the group consisting of hydrogen, lower alkyl of one through three carbon atoms, phenyl, benzyl, nitromethyl, cyanomethyl, lower alkoxymethyl having an alkoxy moiety of one through three carbon atoms;

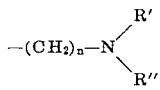

in which $n$ is an integer of 1 through 2, R' and R'' are each selected from the group consisting of hydrogen and alkyl of one through three carbon atoms and when combined is an alkylidene bridge of four through five carbon atoms; amino and lower dialkyl amino; $R_1$ is selected from the group consisting of hydroxy and lower acyloxy; $R_2$, $R_3$, $R_4$, and $R_5$ are selected from the group consisting of hydrogen, lower alkyl of one through three carbon atoms, halogen, nitro, cyano, trifluoromethyl, lower alkoxy, lower alkylthio, lower alkylsulfinyl, lower alkylsulfonyl, amino, lower alkanoylamino and lower dialkylamino; and a pharmacologically acceptable acid addition salt thereof.

Examples of lower alkyl include methyl, ethyl, propyl and isopropyl. Examples of

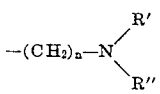

wherein $n$ is an integer of 1 through 2, R' and R'' are each selected from the group consisting of hydrogen and alkyl of from one through three carbon atoms and when combined is an alkylidene bridge of four through five carbon atoms, include dimethylaminomethyl, dimethylaminoethyl, diethylaminomethyl, ethylaminoethyl, propylaminomethyl, propylaminoethyl, methylpropylaminomethyl, pyrrolidinomethyl and piperidinomethyl. Examples of lower acyloxy include acetoxy and propionyloxy. Examples of halogen include fluoro, chloro, bromo and iodo. Examples of lower alkoxy include methoxy, ethoxy, propoxy and isopropoxy. Examples of lower alkyl thio include methylthio, ethylthio, propylthio and isopropylthio. Examples of lower alkylsulfinyl include methylsulfinyl, ethylsulfinyl, propylsulfinyl and isopropylsulfinyl. Examples of lower alkysulfonyl include methylsulfonyl, ethylsulfonyl, propylsulfonyl and isopropylsulfonyl. Examples of lower alkanoylamino include acetylamino and propionylamino. Examples of lower dialkylamino include dimethylamino, diethylamino, dipropylamino and diisopropylamino.

The novel 6-phenyl-s-triazolo[4,3-a][1,4]benzodiazepines of Formulas I, II, III and IV exist either in the non-protonated (free base) form or in the protonated (acid addition salt) form, depending on the pH of the environment. They form stable protonates, i.e., pharmacologically acceptable acid addition salts, on acidification of the free base form with suitable pharmacologically acceptable acids, for example, hydrochloric, hydrobromic, sulfuric, phosphoric, nitric, acetic, propionic, palmitic, benzoic, salicylic, hexynoic, phenylbutyric, naphthoic, glycolic, succinic, nicotinic, tartaric, maleic, malic, pamoic, methanesulfonic, cyclohexanesulfonic, picric and lactic acids, and the like. Conversely, the free base of the novel compounds of Formulas I, II, III and IV can be obtained from a salt (e.g., from the hydrochloride or sulfate salt) by neutralization with a base such as sodium hydroxide, extracting with an immiscible solvent, for example chloroform, drying the extract, for example with anhydrous sodium sulfate, and removing the solvent by evaporation.

The novel compounds and processes for their production, certain of which are novel, are illustratively represented by the following sequence of formulas:

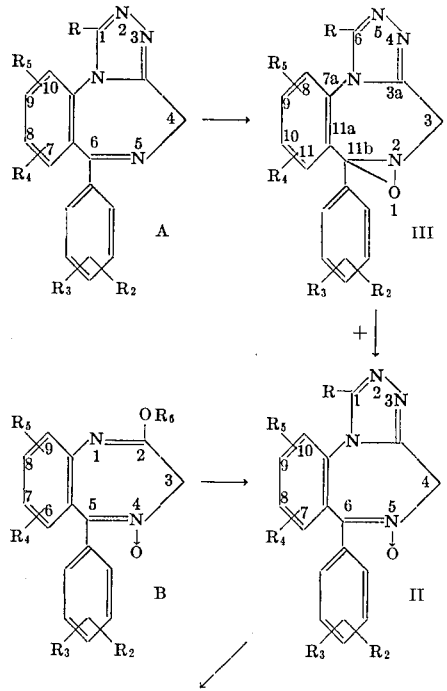

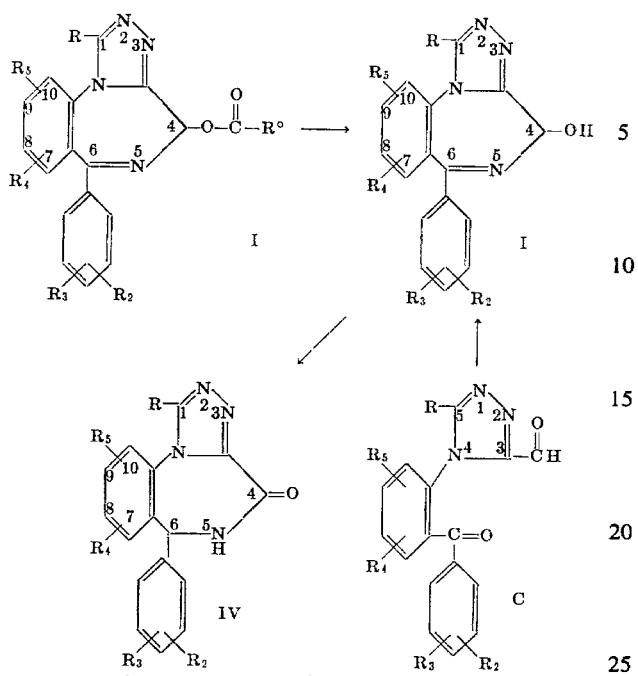

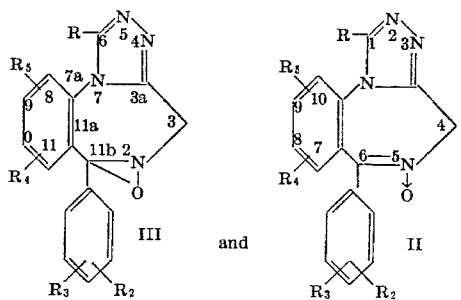

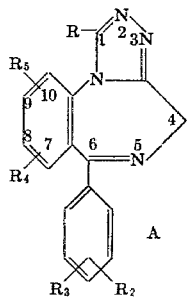

wherein $R^v$ and $R_6$ are lower alkyl and R, $R_1$, $R_2$, $R_3$, $R_4$ and $R_5$ have the same meaning as above.

The processes for preparing the novel compounds of Formulas I, II, III and IV are described below.

Process A. Starting material (A) $\xrightarrow{peracid}$ III and II

The compounds of the respective formulas wherein R, $R_2$, $R_3$, $R_4$ and $R_5$ have the same meaning as above, are prepared by mixing a corresponding compound of the formula wherein R, $R_2$, $R_3$, $R_4$ and $R_5$ have the same meaning as above, with a peracid.

An appropriately substituted or unsubstituted starting material of Formula A can be prepared by condensing a corresponding 1,3-dihydro-5-phenyl-2H-1,4-benzodiazepine-2-thione of the formula

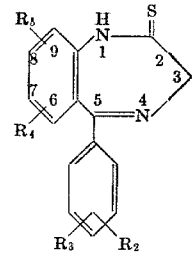

wherein $R_2$, $R_3$, $R_4$ and $R_5$ have the same meaning as above, (prepared in accordance with the procedures described in U. S. Pat. No. 3,422,091) with a corresponding hydrazide of the formula

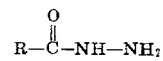

wherein R has the same meaning as above.

Process A involves reacting about 1 molar equivalent of a substituted or unsubstituted 6-phenyl-4H-s-triazolo[4,3-a][1,4]benzodiazepine (A) with about 2 molar equivalents of a peracid (also known as peroxy acid) such as peroxyacetic acid, perbenzoic acid, perphthalic acid or, preferably m-chloroperbenzoic acid, in a solvent such as a lower alkanol, chloroform, methylene chloride, etc. at from about 0° to 25° C. for from about 6 to 48 hours, to yield a corresponding 6-phenyl-4H-s-triazolo[4,3-a][1,4]benzodiazepine 5-oxide (II) and a corresponding 11b-phenyl-3H,11bH-oxazirino[3,2-d]-s-triazolo[4,3-a][1,49 benzodiaze-pine (III).

Process B III $\xrightarrow{heat}$ II

A compound of the formula

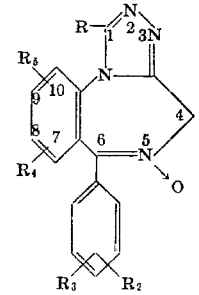

wherein R, $R_2$, $R_3$, $R_4$ and $R_5$ have the same meaning as above, is prepared by heating a corresponding compound of the formula

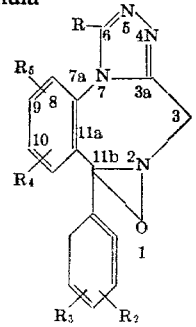

wherein R, $R_2$, $R_3$, $R_4$ and $R_5$ have the same meaning as above.

Process B comprises heating a substituted or unsubstituted 11b-phenyl-3H,11bH-oxazirino[3,2-a]-s-triazolo [4,3-a][1,4]benzodiazepine of Formula III (prepared as in Process A), preferably under nitrogen, in a solvent such as mesitylene, tetralin or decalin at from about 150° C. to about 170° C. for from about 10 to about 30 minutes, to yield a corresponding 6-phenyl-4H-s-triazolo[4,3-a][1,4]-benzodiazepine 5-oxide (II).

Process C Starting material (B) $\xrightarrow{hydrazide}$ II

A compound of the formula

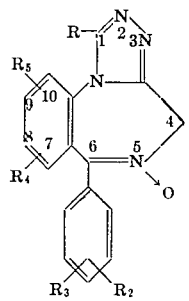

wherein R, $R_2$, $R_3$, $R_4$ and $R_5$ have the same meaning as above, is prepared by condensing a corresponding compound of the formula

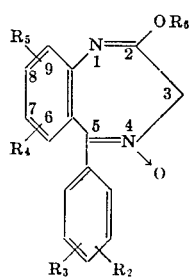

B wherein $R_2$, $R_3$, $R_4$, $R_5$ and $R_6$ have the same meaning as above, (prepared in accordance with the procedures of U. S. Pat. Nos. 3,247,186 and 3,312,688) with a corresponding hydrazide of the formula

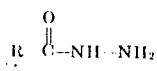

wherein R has the same meaning as above.

Process C is carried out by condensing a substituted or unsubstituted 2-$OR_6$-5-phenyl-3H-1,4-benzodiazepine-4-oxide (B) with an appropriate acid hydrazide in a solvent such as 1-butanol or 1-pentanol at from about 100° C. to about 138° C. for from about 12 to about 48 hours, to yield a corresponding 6-phenyl-4H-s-triazolo[4,3-a][1,4]benzodiazepine 5-oxide (II).

Process D II $\xrightarrow{acid\ anhydride}$ I (4-acylate) $\xrightarrow{hydrolysis}$ I(4ol) $\xrightarrow{tautomerization}$ IV A compound of the formula

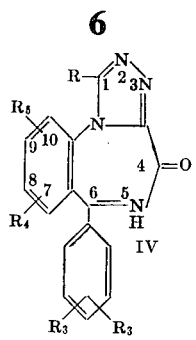

wherein R, $R_2$, $R_3$, $R_4$ and $R_5$ have the same meaning as above, is prepared by steps comprising
1. mixing a corresponding compound of the formula

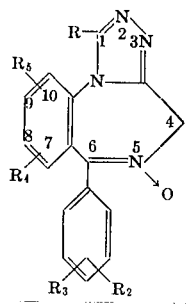

wherein R, $R_2$, $R_3$, $R_4$ and $R_5$ have the same meaning as above, with an acid anhydride of a lower alkyl carboxylic acid to yield a corresponding compound of the formula

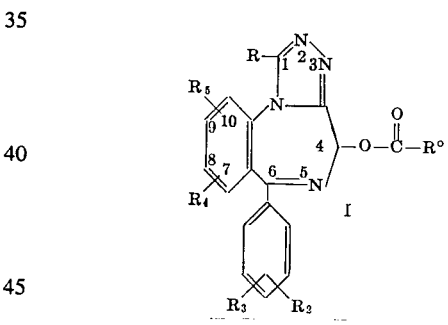

wherein $R^0$ is lower alkyl and R, $R_2$, $R_3$, $R_4$ and $R_5$ have the same meaning as above;

2. mixing in the cold a thus produced corresponding compound resulting from step (1) with an alkali metal hydroxide to yield a corresponding compound of the formula

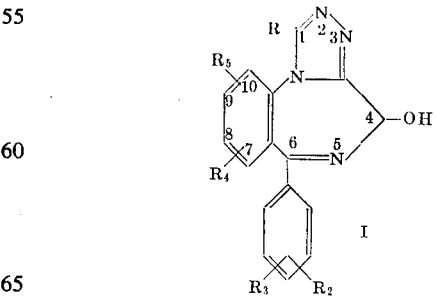

I wherein R, $R_2$, $R_3$, $R_4$ and $R_5$ have the same meaning as above, and 3. mixing a thus produced corresponding compound resulting from step (2) with an alkali metal hydroxide to yield a corresponding compound of Formula IV, above.

The first step of Process D involves mixing an acid anhydride (e.g., acetic anhydride or propionic anhydride) or an acid and its anhydride (e.g., acetic acid and acetic anhydride) with a substituted or unsubstituted 6-phenyl-4H-s-triazolo[4,3-a][1,4]benzodiazepine 5-oxide (II) at from about 100° C. to about 140° C. for from about 10 to about 60 minutes, to yield a corresponding 4-acyloxy-6-phenyl-4H-s-triazolo[4,3-a][1,4]benzodiazepine (I).

2. The next step of the process comprises hydrolyzing in the cold at the 4-position of a substituted or unsubstituted 4-acyloxy-6-phenyl-4H-s-triazolo[4,3-a][1,4]benzodiazepine (I) produced in step (I), for example, by slowly adding, in the course of about 1 to about 5 hours, a dilute aqueous solution of an alkali metal hydroxide (e.g., sodium hydroxide; to an ice cold aqueous alkanol (e.g., ethanol) solution of an aforesaid 4-acyloxy compound (I), to yield a corresponding 6-phenyl-4H-s-triazolo[4,3-a][1,4]benzodiazepin-4-ol (I).

3. In the final step of Process D, a substituted or unsubstituted 6-phenyl-4H-s-triazolo[4,3-a][1,4]benzodiazepin-4-ol (I) produced in step (2) is tautomerized at the 4-position and selectively reduced at the 5-position, for example, by reacting a solution or suspension of an aforesaid 4-ol (I) with a dilute aqueous solution of an alkali metal hydroxide (e.g., sodium hydroxide or potassium hydroxide) at from about 25° C. to about 50° C. for a period of from about 1 to about 8 hours, to yield a corresponding 6-phenyl-4H-s-triazolo[4,3-a][1,4]benzodiazepin-4-one (IV).

Process E Starting material (C) $\xrightarrow{ammonia}$ I (4-ol)

A compound of the formula

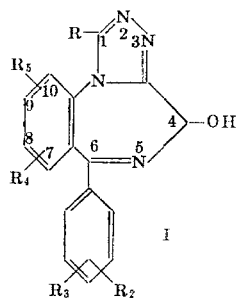

I wherein R, R$_2$, R$_3$, R$_4$ and R$_5$ have the same meaning as above, is prepared by mixing a corresponding compound of the formula

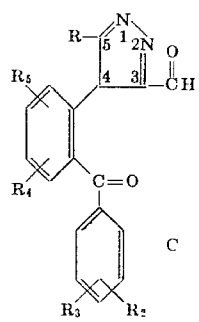

C wherein R, R$_2$, R$_3$, R$_4$ and R$_5$ have the same meaning as above, with ammonia in a lower alkanol.

Process E comprises dissolving an appropriate substituted or unsubstituted 4-(2-benzoylphenyl)-4H-1,2,4-triazole-3-carboxaldehyde (C) in a solution of ammonia (preferably anhydrous) in a lower alkanol (e.g., ethanol) at a temperature of from about 0° C. to about 25° C. and allowing the reaction mixture to stand for from about 2 to about 6 hours, to yield a corresponding 6-phenyl-4H-2-triazolo[4,3-a][1,4-benzodiazepin-4-ol (I).

An appropriately substituted or unsubstituted starting material of Formula C can be prepared by steps comprising 1. heating under nitrogen a mixture of a 2-halo-4-phenylquinoline (prepared as in J. Heterocyclic Chem. 3, 359) and hydrazine hydrate, to yield a 2-hydroazino-4-phenylquinoline;

2. refluxing an equimolar mixture of a 4-phenyl-quinoline prepared in step (1) and a trialkyl orthoacetate, under nitrogen, in a solvent (e.g., xylene), to yield a corresponding 5-phenyl-s-triazolo[4,3-a]quinoline;

3. reacting an s-triazolo[4,3-a]quinoline prepared in step (2) (in acetone) in the cold with a mixture of ruthenium dioxide and sodium periodate (in water), to yield a corresponding (1,2,4-triazol-4-yl)benzophenone and a corresponding 4-(2-benzoylphenyl)-4H-1,2,4-triazole-3-carbox-aldehyde (C). (The preparation of a specific starting material of Formula C, namely, 4-(2-benzoyl-4-chlorophenyl)-5-methyl-4H-1,2,4-triazole-3-carboxaldehyde, is described in Parts A, B and C of Example 6, below.)

All of the novel compounds included with Formulas I, II, III and IV and the starting materials (A, B and C) therefor of the flow-sheet, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, ethyl acetate, ether, methylene chloride and Skellysolve B (hexanes), mixtures and combinations of these solvents; also by gradient elution chromatography from an adsorbent column with a suitable mixture of solvents, such as, methylene chlorideSkellysolve B, acetone-Skellysolve B, and the like.

The novel compounds of Formulas I, II, III and IV and the pharmacologically acceptable acid addition salts thereof have sedative, hypnotic, anticonvulsant, tranquilizing and muscle relaxant effects in mammals and birds. Also, as feed additives for increasing growth rate and feed efficiency of livestock.

Sedative effects of the compound of this invention are shown by the following tests in mice:

Chimney test: [Med. Exp. 4, 145 (1961)]: The test determines the ability of mice to back up and out of a vertical glass cylinder within 30 seconds. At the effective dosage, 50 percent of the mice failed doing it.

Dish test: Mice in Petri dishes (10 cm. diameter, 5 cm. high, partially embedded in wood shavings), climb out in a very short time, when not treated.

Mice remaining in the dish for more than 3 minutes indicates tranquilization. $ED_{50}$ equals the dose or test compound at which 50 percent of the mice remain in the dish.

Pedestal test: The untreated mouse leaves a standard pedestal in less than a minute to climb back to the floor of the standard mouse box. Tranquilized mice will stay on the pedestal for more than 1 minute.

Nicotine antagonism test: Mice in a group of six are injected with the test compound. Thirty minutes later the mice including control (untreated) mice are injected with nicotine salicylate (2 mg./kg.). The control mice show overstimulation, i.e., (1) running convulsions followed by (2) tonic extensor fits; followed by (3) death.

Antagonism to strychnine (as sulfate): The test consists in orally administering into groups of six mice the test compound, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The following compounds typical of this invention have (by intraperitoneal injection) $ED_{50}$ as shown in the table below.

| COMPOUND | $ED_{50}$ (in mg./kg.) | | | |
|---|---|---|---|---|
| | Ch | D | P | Ni |
| 8-chloro-1-methyl-6-phenyl-4H-s-triazolo[4,3-a][1,4]benzodiazepin-4-ol (I) | 6.3 | 6.3 | 20 | 4 |
| 4-acetoxy-8-chloro-1-methyl-6-phenyl-4H-s-trizaolo[4,3-a][1,4]benzodiazepine (I) | 2.8 | 8 | 10 | 1 |
| 8-chloro-1-methyl-6-phenyl-4H-s-triazolo[4,3-a][1,4]-benzodiazepine 5-oxide (II) | 5 | 1.1 | 2 | 0.25 |
| 10-chloro-6-methyl-11b-phenyl-3H,11H-oxazirino[3,2-d]-s-triazolo[4,3-a][1,4]benzodiazepine (III) | 1.4 | 1 | 1.1 | 0.14 |
| 8-chloro-5,6-dihydro-1-methyl-6-phenyl-4H-s-triazolo[4,3-a][1,4]benzodiazepin-4-one (IV) | 32 | 71 | >100 | >100 |

Ch = chimney test
D = dish test
P = pedestal test
Ni = nicotine antagonism (3) test The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like can be used as carriers or for coating purposes. Oil, e.g., coconut oil, sesame oil, safflower oil, cottonseed oil, peanut oil can be used for preparing solutions or suspensions of the active drug. Sweetening, coloring and flavoring agents can be added.

For mammals and birds food premixes, with starch, oatmeal, dried fishmeat, fishmeal, flour and the like can be prepared.

As tranquilizers the compounds of Formulas I, II, III and IV can be used in dosages of 0.1 mg. to 20.0 mg./kg. in oral or injectable preparations as described above, to alleviate tension and anxiety in mammals, or birds, such as e.g., occurs when animals are travelling.

DETAILED DESCRIPTION OF THE INVENTION

The following preparation and examples are illustrative of the processes and products of the present invention, but are not to be construed as limiting.

Preparation 1 8-chloro-1-methyl-6-phenyl-4H-s-triazolo-[4,3-a][1,4]benzodiazepine (A)

A mixture of 5 g. of 7-chloro-1,3-dihydro-5-phenyl-2H-1,4-benzodiazepine-2-thione (prepared as in U. S. Pat. No. 3,422,091) and 3.89 g. of acethydrazide in 175 ml. of absolute ethanol is heated for about 24 hours. The reaction mixture is then cooled and concentrated to give a residue. The residue is treated with water and the aqueous suspension filtered. The solids remaining on the filter are dissolved in methylene chloride, the solution dried over anhydrous potassium carbonate, evaporated to dryness and then recrystallized from ethyl acetate. The material thus obtained is melted under nitrogen in an oil bath maintained at about 250° C., cooled and recrystallized from ethyl acetate to give 8-chloro-1-methyl-6-phenyl-4H-s-triazolo[4,3-a][1,4]-benzodiazepine (A) having a melting point of 227.5° C. to 228.5° C.

Following the procedure of Preparation 1 but substituting another known representative 2H-1,4-benzodiazepine-2-thione starting material (prepared as in U. S. Pat. No. 3,422,091) and reacting it with acethydrazide or another known representative hydrazide, such as 1. 1,3-dihydro-5-phenyl-2H-1,4-benzodiazepine-2-thione and acethydrazide,
2. 60chloro-1,3-dihydro-5-(o-bromophenyl)-2H-1,4-benzodiazepine-2-thione and acethydrazide, (5)-chloro-
3. 7-chloro-1,3-dihydro-5-(2,4-dichlorophenyl)-2H-1,4-benzodiazepine-2-thione and acethydrazide,
4. 8-bromo-1,3-dihydro-5-(3,4-dimethylphenyl)-2H-1,4-benzodiazepine-2-thione and acethydrazide,
5. 7-bromo-1,3-dihydro-5-(2-methyl-4-methoxyphenyl)-2H-1,4-benzodiazepine-2-thione and acethydrazide,
6. 1,3-dihydro-7-methyl-5-(3-methyl-5-chlorophenyl)-2H-1,4-benzodiazepine-2-thione and acethydrazide,
7. 1,3-dihydro-7-fluoro-9-nitro-5-phenyl-2H-1,4-benzodiazepine-2-thione and acethydrazide,
8. 1,3-dihydro-5-[p-(propionylamino)phenyl]-2H-1,4-benzodiazepine-2-thione and acethydrazide,
9. 8-cyano-1,3-dihydro-5-[p-(trifluoromethyl)phenyl]-2H-1,4-benzodiazepine-2-thione and butyric acid hydrazide,
10. 7,9-dichloro-1,3-dihydro-5-(o-chlorophenyl)-2H-1,4-benzodiazepine-2-thione and isobutyric acid hydrazide,
11. 7-bromo-1,3-dihydro-8-ethylthio-5-(o-fluorophenyl)-2H-1,4-benzodiazepine-2-thione and formic acid hydrazide, 12. 1,3-dihydro-9-diisopropylamino-7-ethyl-5-[m-(propylsulfonyl)phenyl]-2H-1,4-benzodiazepine-2-thione and formic acid hydrazide,
13. 1,3-dihydro-7-fluoro-5-(3-methyl-5-chlorophenyl)-2H-1,4-benzodiazepine-2-thione and formic acid hydrazide,
14. 7-bromo-1,3-dihydro-5-phenyl-2H-1,4-benzodiazepine-2-thione and benzoic acid hydrazide,
15. 7-chloro-1,3-dihydro-5-(m-chlorophenyl)-2H-1,4-benzodiazepine-2-thione and benzoic acid hydrazide,
16. 7-bromo-1,3-dihydro-5-[o-(ethylsulfinyl)phenyl]-8-methoxy-2H-1,4-benzodiazepine-2-thione and phenylacetic acid hydrazide,
17. 8-chloro-1,3-dihydro-5-phenyl-2H-1,4-benzodiazepine-2-thione and nitroacetic acid hydrazide,
18. 7-bromo-5-(o-bromophenyl)-1,3-dihydro-8-ethyl-2H-1,4-benzodiazepine-2-thione and cyanoacetic acid hydrazide,
19. 7,9-bis(dipropylamino)-1,3-dihydro-5-(o-nitrophenyl)-2H-1,4-benzodiazepine-2-thione and methoxyacetic acid hydrazide,
20. 9-trifluoromethyl-6,8-diethyl-1,3-dihydro-5-(o-nitrophenyl)-2-H-1,4-benzodiazepine-2-thione and ethoxy acetic acid hydrazide,
21. 1,3-dihydro-6-nitro-5-(o-cyanophenyl)-2H-1,4-benzodiazepine-2-thione and (dimethylamino)acetic acid hydrazide,
22. 1,3-dihydro-7-trifluoromethyl-5-(2,6-difluorophenyl)-2H-1,4-benzodiazepine-2-thione and (diethylamino)-acetic acid hydrazide,
23. 7-chloro-1,3-dihydro-8-methylmercapto-9-nitro-5-phenyl-2H-1,4-benzodiazepine-2-thione and (methylpropylamino)proprionic acid hydrazide,
24. 7,8-dibromo-1,3-dihydro-5-(m-ethoxyphenyl)-2H-1,4-benzodiazepine-2-thione and aminoacetic acid hydrazide,
25. 7-chloro-1,3-dihydro-8-nitro-5-[(o-trifluoromethyl)phenyl]-2H-1,4-benzodiazepine-2-thione and (ethylamino)acetic acid hydrazide,
26. 1,3-dihydro-6-ethylthio-5-(p-fluorophenyl)-2H-1,4-benzodiazepine-2-thione and (diethylamino)acetic acid hydrazide,
27. 7-trifluoromethyl-1,3-dihydro-8-methyl-5-(o-nitrophenyl)-2H-1,4-benzodiazepine-2-thione and (ethyl-methylamino)acetic acid hydrazide,
28. 7-chloro-1,3-dihydro-5-(3,5-dinitrophenyl)-2H-1,4-benzodiazepine-2-thione and 3-pyrrolidinoacetic acid hydrazide,
29. 8-bromo-1,3-dihydro-5-(2-chloro-4-fluorophenyl)-7-ethyl-2H-1,4-benzodiazepine-2-thione and pyrrolidinoacetic acid hydrazide,
30. 1,3-dihydro-5-(2-ethyl-4-propylphenyl)-7,8,9-trimethyl-2H-1,4-benzodiazepine-2-thione and piperidinoacetic acid hydrazide,
31. 1,3-dihydro-7-dimethylamino-5-phenyl-2H-1,4-benzodiazepine-2-thione and propionic acid hydrazide,
32. 6,8-diethyl-1,3-dihydro-6-nitro-5-(m-ethylphenyl)-2H-1,4-benzodiazepine-2-thione and nitroacetic acid hydrazide,
33. 7,8-dibromo-1,3-dihydro-5-phenyl-2H-1,4-benzodiazepine-2-thione and cyanoacetic acid hydrazide,
34. 1,3-dihydro-6,7-dimethyl-5-(o-propylphenyl)-8-trifluoromethyl-2H-1,4-benzodiazepine-2-thione and (diethylamino)acetic acid hydrazide,
35. 8-trifluoromethyl-7-ethyl-5-(m-iodophenyl)-2H-1,4-benzodiazepine-2-thione and (methylamino)acetic acid hydrazide,
36. 7-bromo-8-propoxy-5-(p-propoxyphenyl)-2H-1,4-benzodiazepine-2-thione and (dipropylamino)acetic acid hydrazide,
37. 1,3-dihydro-9-acetylamino-5-phenyl-2H-1,4-benzodiazepine-2-thione and propionic acid hydrazide,
38. 7,8-dichloro-9-trifluoromethyl-5-phenyl-2H-1,4-benzodiazepine-2-thione and benzoic acid hydrazide,
39. 8-bromo-1,3-dihydro-5-(m-fluorophenyl)-7-methyl-2H-1,4-benzodiazepine-2-thione and phenylacetic acid hydrazide,
40. 6,9-dichloro-1,3-dihydro-5-(p-isopropylphenyl)-2H-1,4-benzodiazepine-2-thione and nitroacetic acid hydrazide,
41. 7,8-diethyl-1,3-dihydro-5-(m-ethylphenyl)-2H-1,4-benzodiazepine-2-thione and cyanoacetic acid hydrazide,
42. 7-bromo-1,3-dihydro-8-ethyl-5-(p-propoxyphenyl)-2H-1,4-benzodiazepine-2-thione and propoxyacetic acid hydrazide,
43. 8-chloro-1,3-dihydro-6-propyl-5-(o-propylphenyl)-2H-1,4-benzodiazepine-2-thione and (methylethylamino)acetic acid hydrazide,
44. 7,8-dibromo-1,3-dihydro-6-ethyl-5-[m-(ethylsulfinyl)phenyl]-2H-1,4-benzodiazepine-2-thione and aminoacetic acid hydrazide,
45. 8-bromo-1,3-dihydro-7-methyl-5-phenyl-2H-1,4-benzodiazepine-2-thione and piperidinoacetic acid hydrazide, 46. 1,3-dihydro-7-ethyl-8-fluoro-5-(o-propoxyphenyl)-2H-1,4-benzodiazepine-2-thione and propoxyacetic acid hydrazide,
47. 9-chloro-1,3-dihydro-7-fluoro-5-phenyl-2H-1,4-benzodiazepine-2-thione and isopropoxyacetic acid hydrazide,
48. 7-chloro-1,3-dihydro-8-ethyl-5-(2,4-difluorophenyl)-2H-1,4-benzodiazepine-2-thione and ethoxyacetic acid hydrazide,
49. 8-bromo-1,3-dihydro-5-[o-(ethylsulfonyl)phenyl]-7-propoxy-2H-1,4-benzodiazepine-2-thione and formic acid hydrazide,
50. 9-acetylamino-7,8-dichloro-1,3-dihydro-6-ethyl-5-(m-nitrophenyl)-2H-1,4-benzodaizepine-2-thione and benzoic acid hydrazide, etc., yields, respectively,
1. 1-methyl-6-phenyl-4H-s-triazolo[4,3-a][1,4]-benzodiazepine (A),
2. 6-(o-bromophenyl)-7-chloro-1-methyl-4H-s-triazolo-[4,3-a][1,4]benzodiazepine (A),
3. 8-chloro-6-(2,4-dichlorophenyl)-1-methyl-4H-s-triazolo[4,3-a][1,4]benzodiazepine (A),
4. 9-bromo-6-(3,4-dimethylphenyl)-1-methyl-4H-s-triazolo[4,3-a][1,4]benzodiazepine (A),
5. 8-bromo-1-methyl-6-(2-methyl-4-methoxyphenyl)-4H-s-triazolo[4,3-a][1,4]benzodiazepine (A),
6. 1,8-dimethyl-6-(3-methyl-5-chlorophenyl)-4H-s-triazolo[4,3-a][1,4]benzodiazepine (A),
7. 8-fluoro-1-methyl-10-nitro-6-phenyl-4H-s-triazolo[4,3-a-[1,4]benzodiazepine (A),
8. 1-methyl-6-[p-(propionylamino)phenyl]-4H-s-triazolo[4,3-a][1,4]benzodiazepine (A), 9. 9-cyano-1-propyl-6-[p-(trifluoromethyl)phenyl]-4H-s-triazolo[4,3-a][1,4]benzodiazepine (A),
10. 6-(o-chlorophenyl)-8,10-dichloro-1-isopropyl-4H-s-triazolo[4,3-a][1,4]benzodiazepine (A),
11. 8-bromo-9-ethylthio-6-(o-fluorophenyl)-4H-s-triazolo[4,3-a][1,4]benzodiazepine (A),
12. 10-diisopropylamino-8-ethyl-6-[m-(propylsulfonyl)-phenyl]-4H-s-triazolo[4,3-a][1,4]benzodiazepine (A),
13. 8-fluoro-6-(3-methyl-5-chlorophenyl)-4H-s-triazolo[4,3-a][1,4]benzodiazepine (A),
14. 8-bromo-1,6-diphenyl-4H-s-triazolo[4,3-a][1,4]-benzodiazepine (A),
15. 8-chloro-6-(m-chlorophenyl)-1-phenyl-4H-s-triazolo[4,3-a][1,4]benzodiazepine (A),
16. 1-benzyl-8-bromo-6-[o-(ethylsulfinyl)phenyl]-9-methoxy-4H-s-triazolo[4,3-a][1,4]benzodiazepine (A),
17. 9-chloro-1-nitromethyl-6-phenyl-4H-s-triazolo-[4,3-a][1,4]benzodiazepine (A),
18. 8-bromo-6-(o-bromophenyl)-1-cyanomethyl-9-ethyl-4H-s-triazolo[4,3-a][1,4]benzodiazepine (A),
19. 8,10-bis(dipropylamino)-1-methoxymethyl-6-(o-nitrophenyl)-4H-s-triazolo[4,3-a][1,4]benzodiazepine (A),
20. 10-trifluoromethyl-7,9-diethyl-1-ethoxymethyl-6-(o-nitrophenyl)-4H-s-triazolo[4,3-a][1,4]benzodiazepine (A),
21. 6-(o-cyanophenyl)-1-(dimethylamino)methyl-7-nitro-4H-s-triazolo[4,3-a][1,4]benzodiazepine (A),
22. 1-(diethylamino)methyl-6-(2,6-difluorophenyl)-8-trifluoromethyl-4H-s-triazolo[4,3-a][1,4]benzodiazepine (A),
23. 8-chloro-9-methylmercapto-1-(methylpropylamino)-ethyl-10-nitro-6-phenyl-4H-s-triazolo[4,3-a][1,4]benzodiazepine (A),
24. 1-aminomethyl-8,9-dibromo-6-(m-ethoxyphenyl)-4H-s-triazolo[4,3-a][1,4]benzodiazepine (A),
25. 8-chloro-6-[(o-trifluoromethyl)phenyl]-1-(ethylamino)methyl-9-nitro-4H-s-triazolo[4,3-a][1,4]benzodiazepine (A),
26. 1-(diethylamino)methyl-7-ethylthio-6-(p-fluorophenyl)-4H-s-triazolo[4,3-a][1,4]benzodiazepine (A),
27. 8-trifluoromethyl-1-(ethylmethylamino)methyl-9-methyl-6-(o-nitrophenyl)-4H-s-triazolo[4,3-a][1,4]benzodiazepine (A),
28. 8-chloro-6-(3,5-dinitrophenyl)-1-pyrrolidinomethyl-4H-s-triazolo[4,3-a][1,4]benzodiazepine (A),
29. 9-bromo-6-(2-chloro-4-fluorophenyl)-8-ethyl-1-pyrrolidinomethyl-4H-s-triazolo[4,3-a][1,4]benzodiazepine (A),
30. 6-(2-ethyl-4-propylphenyl)-1-piperidinomethyl-8,9,10-trimethyl-4H-s-triazolo[4,3-a][1,4]benzodiazepine (A),
31. 8-dimethylamino-1-ethyl-6-phenyl-4H-s-triazolo-[4,3-a][1,4]benzodiazepine (A),
32. 7,9-diethyl-6-(m-ethylphenyl)-7-nitro-1-nitromethyl-4H-s-triazolo[4,3-a][1,4]benzodiazepine (A),
33. 1-cyanomethyl-8,9-dibromo-6-phenyl-4H-s-triazolo-[4,3-a][1,4]benzodiazepine (A),
34. 1-(diethylamino)methyl-7,8-dimethyl-6-(o-propylphenyl)-9-trifluoromethyl-4H-s-triazolo[4,3-a][1,4]-benzodiazepine (A),
35. 9-trifluoromethyl-8-ethyl-6-(m-iodophenyl)-1-(methylamino)methyl-4H-s-triazolo[4,3-a][1,4]benzodiazepine (A),
36. 8-bromo-1-(dipropylamino)methyl-9-propoxy-6-(p-propoxyphenyl)-4H-s-triazolo[4,3-a][1,4]benzodiazepine (A),
37. 10-acetylamino-1-ethyl-6-phenyl-4H-s-triazolo-[4,3-a][1,4]benzodiazepine (A),
38. 8,9-dichloro-1,6-diphenyl-10-trifluoromethyl-4H-s-triazolo[4,3-a][1,4]benzodiazepine (A),
39. 1-benzyl-9-bromo-6-(m-fluorophenyl)-8-methyl-4H-s-triazolo[4,3-a][1,4]benzodiazepine (A),
40. 7,10-dichloro-6-(p-isopropylphenyl)-1-nitromethyl-4H-s-triazolo[4,3-a][1,4]benzodiazepine (A),
41. 1-cyanomethyl-8,9-diethyl-6-(m-ethylphenyl)-4H-s-triazolo[4,3-a][1,4]benzodiazepine (A),
42. 8-bromo-9-ethyl-1-propoxymethyl-6-(p-propoxy-phenyl)-4H-s-triazolo[4,3-a][1,4]benzodiazepine (A),
43. 9-chloro-1-(methylethylamino)methyl-7-propyl-6-(o-propylphenyl)-4H-s-triazolo[4,3-a][1,4]benzodiazepine (A),
44. 1-aminomethyl-8,9-dibromo-7-ethyl-6-[m-(ethyl-sulfinyl)phenyl]-4H-s-triazolo[4,3-a][1,4]benzodiazepine (A),
45. 9-bromo-8-methyl-6-phenyl-1-piperidinomethyl-4H-s-triazolo[4,3-a][1,4]benzodiazepine (A),
46. 8-ethyl-9-fluoro-1-propoxymethyl-6-(o-propoxyphenyl)-4H-s-triazolo[4,3-a][1,4]benzodiazepine (A),
47. 10-chloro-1-isopropoxylmethyl-6-phenyl-4H-s-triazolo[4,3-a][1,4]benzodiazepine (A),
48. 8-chloro-6-(2,4-difluorophenyl)-1-ethoxymethyl-9-ethyl-4H-s-triazolo[4,3-a][1,4]benzodiazepine (A),
49. 9-bromo-6-[O-(ethylsulfonyl)phenyl]-8-propoxy-4H-s-triazolo[4,3-a][1,4]benzodiazepine (A),
50. 10-acetylamino-8,9-dichloro-7-ethyl-6-(m-nitrophenyl)-1-phenyl-4H-s-triazolo[4,3-a][1,4]benzodiazepine (A), etc.

Example 1

A. 10-chloro-6-methyl-11b-phenyl-3H,11bH-oxazirino[3,2-d]-s-triazolo[4,3-a][1,4]-benzodiazepine (III)

B. 8-chloro-1-methyl-6-phenyl-4H-s-triazolo-[4,3-a][1,4]benzodiazepine 5-oxide (II)

A. 10-chloro-6-methyl-11b-phenyl-3H,11bH-oxazirino-[3,2-d]-s-triazolo[4,3-a][1,4]benzodiazepine (III)

A stirred solution of 1 g. (0.00324 mole) of 8-chloro-1-methyl-6-phenyl-4H-s-triazolo[4,3-a][1,4]benzodiazepine (A), (obtained as in Preparation 1) in absolute ethanol is cooled in an ice bath and mixed with 1.12 g. (0.00648 mole) of m-chloroperbenzoic acid. The mixture is kept in the ice bath for about 6 hours and then at room temperature for about 18 hours. It is then concentrated under vacuum; the residue is suspended in cold, dilute potassium carbonate solution and extracted with methylene chloride. The extract is washed with water, dried with potassium carbonate, concentrated under vacuum, chromatographed on a 100 g. column of silica gel and 50 ml. fractions collected. Fractions 1 through 48 are eluted with a mixture of 5 percent methanol and 95 percent ethyl acetate and fractions 49 through 70 with 10 percent methanol 90 percent ethyl acetate. The first compound is eluted in fractions 18 through 28 and crystallized from ethyl acetate to give 0.334 g. of 10-chloro-6-methyl-11b-phenyl-3H,11bH-oxazirino[3,2-d]-s-triazolo[4,3-a][1,4]benzodiazepine (III), melting at 169.5° to 170° C. (with decomposition) and 0.031 g. of the same compound melting at 168.5° to 169.5° C. (with decomposition). The analytical sample has a melting point of 167° to 167.5° C., ultraviolet (ethanol) end absorption with inflections at 235 mμ (ϵ=16,700), 263 mμ (ϵ=939), 269 mμ (ϵ=776), 275 mμ (ϵ=594) and 281 mμ (ϵ=523). The infrared, nuclear magnetic resonance and mass spectra support the proposed structure.

Anal. Calcd. for $C_{17}H_{13}ClN_4O$: C, 62.88; H, 4.03; Cl, 10.92; N, 17.25.
Found: C, 62.95; H, 3.94; Cl, 11.05; N, 17.09.

The second compound is eluted from the column in fractions 39 through 48 and crystallized from ethylacetate to give 0.105 g. of starting material, 8-chloro-1-methyl-6-phenyl-4H-s-triazolo[4,3-a][1,4]benzodiazepine, melting at 227.5° to 228.5° C. On mixing this with an authentic sample, the melting point of the mixture is not depressed.

B. 8-chloro-1-methyl-6-phenyl-4H-s-triazolo[4,3-a]-[1,4]benzodiazepine 5-oxide (II)

The third compound eluted from the column in fractions 49 through 70 is mixed with recovered starting material, 8-chloro-1-methyl-6-phenyl-4H-s-triazolo[4,3-a][1,4]-benzodiazepine. Fractional crystallization of this mixture from methanol-ethyl acetate gives 0.066 g. of 8-chloro-1-methyl-6-phenyl-4H-s-triazolo[4,3-a][1,4]benzodiazepine 5-oxide (II), melting at 262° to 263° C. (with decomposition). The analytical sample has a melting point of 272.5° to 273.5° C. Infrared spectroscopy supports the proposed structure.

Following the procedure of Example 1 but substituting other known representative 4H-s-triazolo[4,3-a][1,4]-benzodiazepine (A), such as 1. 1-ethyl-6-phenyl-4H-s-triazolo[4,3-a][1,4]benzodiazepine (A),
2. 8-chloro-6-(3,5-dichlorophenyl)-1-ethyl-4H-s-triazolo[4,3-a][1,4]benzodiazepine (A),
3. 1,8-dipropyl-6-(2-ethyl-4-chlorophenyl)-4H-s-triazolo[4,3-a][1,4]benzodiazepine (A),
4. 8-cyano-6-[p-(propionylamino)phenyl]-4H-s-triazolo-[4,3-a][1,4]benzodiazepine (A),
5. 8-bromo-6-(o-fluorophenyl)-1-isopropyl-4H-s-triazolo[4,3-a][1,4]benzodiazepine (A),
6. 1-benzyl-8-chloro-6-[p-(methylsulfinyl)phenyl]-4H-s-triazolo[4,3-a][1,4]benzodiazepine (A),
7. 9,10-diethyl-8-fluoro-6-[o-(propylsulfonyl)phenyl]-4H-s-triazolo[4,3-a][1,4]benzodiazepine (A),
8. 7,8-bis(diethylamino)-1-ethoxymethyl-6-(o-cyanophenyl)-4H-s-triazolo[4,3-a][1,4] benzodiazepine (A),
9. 1-(diethylamino)methyl-6-(2,4-difluorophenyl)-7-trifluoromethyl-4H-s-triazolo[4,3-a][1,4]benzodiazepine (A),
10. 1-aminomethyl-7,8-dibromo-6-(m-ethoxyphenyl)-4H-s-triazolo[4,3-a][1,4]benzodiazepine (A),
11. 8-chloro-6-[(o-trifluoromethyl)phenyl]-1-pyrrolidinomethyl-4H-s-triazolo[4,3-a][1,4]benzodiazepine (A),
12. 8-bromo-6-(4-chloro-6-fluorophenyl)-7-methyl-1-pyrrolidinomethyl-4H-s-triazolo[4,3-a][1,4]benzodiazepine (A),
13. 9-trifluoromethyl-7-ethyl-6-(p-iodophenyl)-1-methyl-4H-s-triazolo[4,3-a][1,4]benzodiazepine (A),
14. 9-acetylamino-1-ethyl-6-phenyl-4H-s-triazolo[4,3-a[]1,4]benzodiazepine (A),
15. 1-benzyl-9-chloro-6-(o-fluorophenyl)-7-propyl-4H-s-triazolo[4,3-a][1,4]benzodiazepine (A),
16. 7,9-dibromo-1,6-diphenyl-10-trifluoromethyl-4H-s-triazolo[4,3-a][1,4]benzodiazepine (A),
17. 1-cyanomethyl-8,9-dimethyl-6-(m-methylphenyl)-4H-s-triazolo[4,3-a][1,4]benzodiazepine (A),
18. 8-chloro-7-ethyl-1-propoxymethyl-6-(p-propoxy-phenyl)-4H-s-triazolo[4,3-a][1,4]benzodiazepine (A),
19. 1-aminomethyl-7,8-dibromo-9-ethyl-6-[m-(ethyl-sulfinyl)phenyl]-4H-s-triazolo[4,3-a][1,4]benzodiazepine (A),
20. 9-chloro-8-methyl-6-phenyl-1-piperidinomethyl-4H-s-triazolo[4,3-a][1,4]benzodiazepine (A),
21. 7-ethyl-8-fluoro-1-propoxymethyl-6-(o-propoxyphenyl)-4H-s-triazolo[4,3-a][1,4]benzodiazepine (A),
22. 8-chloro-6-(2,5-difluorophenyl)-1-methoxymethyl-9-propyl-4H-s-triazolo[4,3-a][1,4]benzodiazepine (A),
23. 10-acetylamino-7,8-dichloro-9-ethyl-6-(m-nitrophenyl)-1-phenyl-4H-s-triazolo[4,3-a][1,4]benzodiazepine (A),
24. 9-trifluoromethyl-7-ethyl-6-(m-bromophenyl)-1-(methylamino)methyl-4H-s-triazolo[4,3-a][1,4]benzodiazepine (A),
25. 7,9-dichloro-6-(p-isopropylphenyl)-1-nitromethyl-4H-s-triazolo[4,3-a][1,4]benzodiazepine (A), etc., yields, respectively, 1. 1-ethyl-6-phenyl-4H-s-triazolo[4,3-a][1,4]-benzodiazepine 5-oxide (II) and 6-ethyl-11b-phenyl-3H,11bH-oxazirino[3,2-d]-s-triazolo[4,3-a][1,4]benzodiazepine (III),
2. 8-chloro-6-(3,5-dichlorophenyl)-1-ethyl-4H-s-triazolo[4,3-a][1,4]benzodiazepine 5-oxide (II) and 10-chloro-11b-(3,5-dichlorophenyl)-6-ethyl-3H,11bH-oxazirino-[3,2-d]-s-triazolo[4,3-a][1,4] benzodiazepine (III),
3. 1,8-dipropyl-6-(2-ethyl-4-chlorophenyl)-4H-s-triazolo[4,3-a][1,4]benzodiazepine 5-oxide (II) and 6,10-dipropyl-11b-(2-ethyl-4-chlorophenyl)-3H,11bH-oxazirino-[3,2-d]-s-triazolo[4,3-a][1,4] benzodiazepine (III),
4. 8-cyano-6-[p-(propionylamino)phenyl]-4H-s-triazolo-[4,3-a][1,4]benzodiazepine 5-oxide (II) and 10-cyano-11b-[p-(propionylamino)phenyl]-3H,11bH-oxazirino[3,2-d]-s-triazolo[4,3-a][1,4] benzodiazepine (III),
5. 8-bromo-6-(o-fluorophenyl)-1-isopropyl-4H-s-triazolo[4,3-a][1,4]benzodiazepine 5-oxide (II) and 10-bromo-11b-(o-fluorophenyl)-6-isopropyl-3H,11bH-oxazirino-[3,2-d]-s-triazolo[4,3-a][1,4]benzodiazepine (III), 6. 1-benzyl-8-chloro-6-[p-(methylsulfinyl)phenyl]-4H-s-triazolo[4,3-a][1,4]benzodiazepine 5-oxide (II) and 6-benzyl-10-chloro-11b-[p-(methylsulfinyl)phenyl]-3H,11bH-oxazirino[3,2-d]-s-triazolo[4,3-a][1,4]benzodiazepine (III), 7. 9,10-diethyl-8-fluoro-6-[o-(propylsulfonyl)phenyl]-4H-s-triazolo[4,3-a][1,4]benzodiazepine 5-oxide (II) and 8,9-diethyl-10-fluoro-11b-[O-(propylsulfonyl)phenyl]-3H-oxazirino[3,2-d]-s-triazolo[4,3-a][1,4]benzodiazepine (III), 8. 7,8-bis(diethylamino)-1-ethoxymethyl-6-(o-cyanophenyl)-4H-s-triazolo[4,3-a][1,4]benzodiazepine 5-oxide (II) and 10,11-bis(diethylamino)-6-ethoxymethyl-11b-(o-cyanophenyl)-3H,11bH-oxazirino[3,2-d]-s-triazolo[4,3-a]-[1,4]benzodiazepine (III), 9. 1-(diethylamino)methyl-6-(2,4-difluorophenyl)-7-trifluoromethyl-4H-s-triazolo[4,3-a][1,4]benzodiazepine 5-oxide (II), and 6-(diethylamino)methyl-11b-(2,4-difluorophenyl)-11-trifluoromethyl-3H,11bH-oxazirino[3,2-d]-s-triazolo[4,3-a][1,4]benzodiazepine (III), 10. 1-aminomethyl-7,8-dibromo-6-(m-ethoxyphenyl)-4H-s-triazolo[4,3-a][1,4]benzodiazepine 5-oxide (II) and 6-aminomethyl-10,11-dibromo-11b-(m-ethoxyphenyl)-3H,11bH-oxazirino[3,2-d]-s-triazolo[4,3-a][1,4]benzodiazepine (III), 11. 8-chloro-6-[o-(trifluoromethyl)phenyl]-1-pyrrolidinomethyl-4H-s-triazolo[4,3-a][1,4]benzodiazepine 5-oxide (II) and 10-chloro-11b-[o-(trifluoromethyl)phenyl]-6-pyrrolidinomethyl-3H,11bH-oxazirino[3,2-d]-s-triazolo-[4,3-a][1,4]benzodiazepine (III), 12. 8-bromo-6-(4-chloro-6-fluorophenyl)-7-methyl-1-pyrrolidinomethyl-4H-s-triazolo[4,3-a][1,4]benzodiazepine 5-oxide (II) and 10-bromo-11b-(4-chloro-6-fluorophenyl)-11-methyl-6-pyrrolidinomethyl-3H,11bH-oxazirino[3,2-d]-s-triazolo[4,3-a][1,4]benzodiazepine (III), 13. 9-trifluoromethyl-7-ethyl-6-(p-iodophenyl)-1-methyl-4H-s-triazolo[4,3-a][1,4]benzodiazepine 5-oxide (II) and 9-trifluoromethyl-11-ethyl-11b-(p-iodophenyl)-6-methyl-3H,11bH-oxazirino[3,2-d]-s-triazolo[4,3-a][1,4]-benzodiazepine (III), 14. 9-acetylamino-1-ethyl-6-phenyl-4H-s-triazolo-[4,3-a][1,4]benzodiazepine 5-oxide (II) and 9-acetylamino-6-ethyl-11b-phenyl-3H,11bH-oxazirino[3,2-d]-s-triazolo-[4,3-a][1,4]benzodiazepine (III), 15. 1-benzyl-9-chloro-6-(o-fluorophenyl)-7-propyl-4H-s-triazolo[4,3-a][1,4]benzodiazepine 5-oxide (II) and 6-benzyl-9-chloro-11b-(o-fluorophenyl)-11-propyl-3H,11bH-oxazirino[3,2-d]-s-triazolo[4,3-a][1,4]benzodiazepine (III), 16. 7,9-dibromo-1,6-diphenyl-10-trifluoromethyl-4H-s-triazolo[4,3-a][1,4]benzodiazepine 5-oxide (II) and 9,11-dibromo-6,11b-diphenyl-8-trifluoromethyl-3H,11bH-oxazirino[3,2-d]-s-triazolo[4,3-a][1,4]benzodiazepine (III), 17. 1-cyanomethyl-8,9-dimethyl-6-(m-methylphenyl)-4H-s-triazolo[4,3-a][1,4]benzodiazepine 5-oxide (II) and 6-cyanomethyl-9,10-dimethyl-11b-(methylphenyl)-3H,11bH-oxazirino[3,2-d]-s-triazolo[4,3-a][1,4]benzodiazepine (III), 18. 8-chloro-7-ethyl-1-propoxymethyl-6-(p-propoxyphenyl)-4H-s-triazolo[4,3-a][1,4]benzodiazepine 5-oxide (II) and 10-chloro-11-ethyl-11b-(p-propoxyphenyl)-3H,11bH-oxazirino[3,2-d]-s-triazolo[4,3-a][1,4]benzodiazepine (III), 19. 1-aminomethyl-7,8-dibromo-9-ethyl-6-[m-ethylsulfinyl)phenyl]-4H-s-triazolo[4,3-a][1,4]benzodiazepine 5-oxide (II) and 6-aminomethyl-10,11-dibromo-9-ethyl-11b-[m-(ethylsulfinylphenyl]-3H,11bH-oxazirino[3,2-d]-s-triazolo[4,3-a][1,4]benzodiazepine (III), 20. 9-chloro-8-methyl-6-phenyl-1-piperidinomethyl-4H-s-triazolo[4,3-a][1,4]benzodiazepine 5-oxide (II) and 9-chloro-10-methyl-11b-phenyl-6-piperidinomethyl-3H,11bH-oxazirino[3,2-d]-s-triazolo[4,3-a][1,4]benzodiazepine (III), 21. 7-ethyl-8-fluoro-1-propoxymethyl-6-(o-propoxyphenyl)-4H-s-triazolo[4,3-a][1,4]benzodiazepine 5-oxide (II) and 11-ethyl-10-fluoro-6-propoxymethyl-11b-(o-propoxyphenyl)-3H,11bH-oxazirino[3,2-d]-s-triazolo[4,3-a]-[1,4]benzodiazepine (III), 22. 8-chloro-6-(2,5-difluorophenyl)-1-methoxymethyl-9-propyl-4H-s-triazolo[4,3-a][1,4]benzodiazepine 5-oxide (II) and 10-chloro-11b-(2,5-difluorophenyl)-6-methoxymethyl-9-propyl-3H,11bH-oxazirino[3,2-d]-s-triazolo[4,3-a][1,4]-benzodiazepine (III), 23. 10-acetylamino-7,8-dichloro-9-ethyl-6-(m-nitrophenyl)-1-phenyl-4H-s-triazolo[4,3-a][1,4]benzodiazepine 5-oxide (II) and 8-acetylamino-10,11-dichloro-9-ethyl-11b-(m-nitrophenyl)-6-phenyl-3H,11bH-oxazirino[3,2-d]-s-triazolo[4,3-a][1,4]benzodiazepine (III), 24. 9-trifluoromethyl-7-ethyl-6-(m-bromophenyl)-1-(methylamino)methyl-4H-s-triazolo[4,3-a][1,4]benzodiazepine 5-oxide (II) and 9-trifluoromethyl-11-ethyl-11b-(m-bromophenyl)-6-(methylamino)methyl-3H,11bH-oxazirino[3,2-d]-s-triazolo[4,3-a][1,4]benzodiazepine (III), 25. 7,9-dichloro-6-(p-isopropylphenyl)-1-nitromethyl-4H-s-triazolo[4,3-a][1,4]benzodiazepine 5-oxide (II), etc., and 9,11-dichloro-11b-(p-isopropylphenyl)-6-nitromethyl-3H,11bH-oxazirino[3,2-d]-s-triazolo[4,3-a][1,4]benzodiazepine (III), etc.

Example 2  8-chloro-1-methyl-6-phenyl-4H-s-triazolo[4,3-a][1,4]benzodiazepine 5-oxide (II)

A stirred solution of 300.7 mg. (0.001 mole) of 7-chloro-2-methoxy-5-phenyl-3H-1,4-benzodiazepine 4-oxide (B) (prepared as in U.S. Pat. No. 3,247,186), 222 mg. (0.003 mole) of acethydrazide and 10 ml. of 1-butanol is refluxed under nitrogen for about 20 hours and concentrated under vacuum. A suspension of the residue in water is extracted with methylene chloride. The extract is washed with water, dried with potassium carbonate and concentrated. The residue is crystallized from a mixture of methanol and ethyl acetate to give 0.061 g. of 8-chloro-1-methyl-6-phenyl-4H-s-triazolo[4,3-a][1,4]benzodiazepine 5-oxide (II), melting at 272.5° to 273° C. (with decomposition) and 0.065 g. of the same compound (II) melting at 270° to 271° C. (with decomposition). The analytical sample melts at 281° to 282° C.; UV (ethanol) end absorption, λmax. 227 mμ ($\epsilon$=28,850), 256 mμ ($\epsilon$=16,550), 308 mμ ($\epsilon$=11,050), inflection at 262 mμ ($\epsilon$=16,050). The infrared and nuclear magnetic resonance spectra support the proposed structure.

Anal Calcd. for $C_{17}H_{13}ClN_4O$: C, 62.88; H, 4.03; Cl, 10.92; N, 17.25.
Found: C, 62.89; H, 4.39; Cl, 10.80; N, 17.36.

Following the procedure of Example 2 but substituting another representative 3H-1,4-benzodiazepine, 4-oxide (B) (prepared as in U.S. Pat. No. 3,247,186) and reacting it with acethydrazide or another known representative hydrazide, such as
1. 6-bromo-2-propoxy-5-(o-chlorophenyl)-3H-1,4-benzodiazepine-2-oxide (B) and butyric acid hydrazide,
2. 8-chloro-2-ethoxy-5-(p-trifluoromethylphenyl)-3H-1,4-benzodiazepine 4-oxide (B) and propionic acid hydrazide,
3. 2-methoxy-9-methyl-5-(2,5-dimethylphenyl)-3H-1,4-benzodiazepine 4-oxide (B) and acethydrazide,
4. 2-methoxy-6-propyl-5-(2-methyl-6-methoxyphenyl)-3H-1,4-benzodiazepine 4-oxide (B) and cyanoacetic acid hydrazide,
5. 8-cyano-7,9-dichloro-2-ethoxy-6-methyl-5-(m-methylphenyl)-3H-1,4-benzodiazepine 4-oxide (B) and formic acid hydrazide,
6. 7-bromo-8-fluoro-2-propoxy-5-[m-(propylsulfinyl)-phenyl]-3H-1,4-benzodiazepine 4-oxide (B) and formic acid hydrazide,
7. 7,8-dichloro-5-(o-chlorophenyl)-2-methoxy-3H-1,4-benzodiazepine 4-oxide (B) and formic acid hydrazide,
8. 7-cyano-2-methoxy-5-(2-methyl-4-chlorophenyl)-3H-1,4-benzodiazepine 4-oxide (B) and butyric acid hydrazide,
9. 7-chloro-5-(m-fluorophenyl)-2-methoxy-8-methyl-3H-1,4-benzodiazepine 4-oxide (B) and benzoic acid hydrazide,
10. 8-bromo-2,7-diethoxy-5-[o-(methylsulfonyl)phenyl]-3H-1,4-benzodiazepine 4-oxide (B) and phenylacetic acid hydrazide, etc., yields, respectively,
1. 7-bromo-6-(o-chlorophenyl)-1-propyl-4H-s-triazolo[4,3-a][1,4]benzodiazepine 5-oxide (II),
2. 9-chloro-1-ethyl-6-(p-trifluoromethylphenyl)-4H-s-triazolo[4,3-a][1,4]benzodiazepine 5-oxide (II),
3. 1,10-dimethyl-6-(2,5-dimethylphenyl)-4H-s-triazolo[4,3-a][1,4]benzodiazepine 5-oxide (II),
4. 1-cyanomethyl-7-propyl-6-(2-methyl-6-methoxyphenyl)-4H-s-triazolo[4,3-a][1,4]benzodiazepine 5-oxide (II),
5. 9-cyano-8,10-dichloro-7-methyl-6-(m-methylphenyl)-4H-s-triazolo[4,3-a][1,4]benzodiazepine 5-oxide (II),
6. 8-bromo-9-fluoro-6-[m-(propylsulfinyl)phenyl]-4H-s-triazolo[4,3-a][1,4]benzodiazepine 5-oxide (II),
7. 8,9-dichloro-6-(o-chlorophenyl)-4H-s-triazolo[4,3-a][1,4]benzodiazepine 5-oxide (II),
8. 8-cyano-6-(2-methyl-4-chlorophenyl)-1-propyl-4H-s-triazolo[4,3-a][1,4]benzodiazepine 5-oxide (II),
9. 8-chloro-6-(m-fluorophenyl)-9-methyl-1-phenyl-4H-s-triazolo[4,3-a][1,4]benzodiazepine 5-oxide (II),
10. 1-benzyl-9-bromo-8-ethoxy-6-[o-(methylsulfonyl)-phenyl]-4H-s-triazolo[4,3-a][1,4]benzodiazepine 5-oxide (II), etc.

Example 3 8-chloro-1-methyl-6-phenyl-4H-s-triazolo-[4,3-a][1,4]benzodiazepine 5-oxide (II)

A mixture of 300 mg. of 10-chloro-6-methyl-11b-phenyl-3H,11bH-oxazirino[3,2-d]-s-triazolo[4,3-a][1,4]benzodiazepine (III) (prepared as in Example 1) and 3 ml. of 1,3,5-trimethylbenzene is refluxed under nitrogen for about 15 minutes. The cooled reaction mixture is dissolved in methylene chloride and adsorbed on a 25 g. column of silica gel. The column is eluted with a mixture of 5 percent methanol and 95 percent ethyl acetate (fractions 1 through 24) and 10 percent methanol-90 percent ethyl acetate (fractions 25 through 45), 20 to 30 ml. fractions being collected. The starting material (III) amounting to 0.072 g. and having a melting point of 158.5° to 160° C. (with decomposition) is collected in fractions 14 through 24. The product (II) is obtained in fractions 34 through 40. It is recrystallized from methanol ethyl acetate to give 47 mg. of 8-chloro-1-methyl-6-phenyl-4H-s-triazolo[4,3-a][1,4]benzodiazepine 5-oxide (II), melting at 251° to 253° C. The analytical sample has a melting point of 267.5° to 268.5° C. and its proposed structure is confirmed by infrared absorption spectroscopy.

Following the procedure of Example 3 but substituting another representative 3H,11bH-oxazirino[3,2-d]-s-triazolo-[4,3-a][1,4]benzodiazepine (III) (prepared as in Example 1) such as
1. 10-bromo-11b-(2,4-difluorophenyl)-6-propyl-3H,11bH-oxazirino[3,2-d]-s-triazolo[4,3-a][1,4]benzodiazepine (III),
2. 6,10-diethyl-11b-(2-ethyl-4-bromophenyl)-3H,11bH-oxazirino[3,2-d]-s-triazolo[4,3-a][1,4]benzodiazepine (III),
3. 10-cyano-11b-[p-(propionylamino)phenyl]-3H,11bH-oxazirino[3,2-d]-s-triazolo[4,3-a][1,4]benzodiazepine (III),
4. 6-benzyl-10-bromo-11b-(o-fluorophenyl)-3H,11bH-oxazirino[3,2-d]-s-triazolo[4,3-a][1,4]benzodiazepine (III),
5. 10-bromo-6-isopropyl-11b-[p-(methylsulfinyl)-phenyl]-3H,11bH-oxazirino[3,2-d]-s-triazolo[4,3-a][1,4]-benzodiazepine (III),
6. 10,11-bis(diethylamino)-6-methoxymethyl-11b-(o-propylphenyl)-3H,11bH-oxazirino[3,2-d]-s-triazolo[4,3-a]-[1,4]benzodiazepine (III),
7. 6-aminomethyl-10,11-dibromo-11b-(p-propoxyphenyl)-3H,11bH-oxazirino[3,2-d]-s-triazolo[4,3-a][1,4]benzodiazepine (III),
8. 8-trifluoromethyl-10-ethyl-11b-(p-iodophenyl)-6-methyl-3H,11bH-oxazirino[3,2-d]-s-triazolo[4,3-a][1,4]-benzodiazepine (III),
9. 9,11-dichloro-6,11b-diphenyl-8-trifluoromethyl-3H,11bH-oxazirino[3,2-d]-s-triazolo[4,3-a][1,4]benzodiazepine (III),
10. 6-cyanomethyl-8,9-diethyl-11b-(o-propylphenyl)-3H,11bH-oxazirino[3,2-d]-s-triazolo[4,3-a][1,4]benzodiazepine (III),
11. 10-bromo-11-methyl-11b-(m-propoxyphenyl)-3H,11bH-oxazirino[3,2-d]-s-triazolo[4,3-a][1,4]benzodiazepine (III),
12. 9,10-difluoro-6-phenyl-11b-(o-methylphenyl)-8-trifluoromethyl-3H,11bH-oxazirino[3,2-d]-s-triazolo[4,3-a]-[1,4]benzodiazepine 13. 8-chloro-10-ethyl-11b-(o-ethylphenyl)-6-piperidinomethyl-3H,11bH-oxazirino[3,2-d]-s-triazolo[4,3-a][1,4]-benzodiazepine (III),
14. 10-bromo-11b-(2,4-difluorophenyl)-6-ethoxymethyl-9-ethyl-3H,11bH-oxazirino[3,2-d]-s-triazolo[4,3-a][1,4]-benzodiazepine (III),
15. 9-trifluoromethyl-11-ethyl-11b-(p-fluorophenyl)-6-(methylamino)methyl-3H,11bH-oxazirino[3,2-d]-s-triazolo-[4,3-a][1,4]benzodiazepine (III), etc., yields, respectively, 1. 8-bromo-6-(2,4-difluorophenyl)-1-propyl-4H-s-triazolo[4,3-a][1,4]benzodiazepine 5-oxide (II),
2. 1,8-diethyl-6-(2-ethyl-4-bromophenyl)-4H-s-triazolo[4,3-a][1,4]benzodiazepine 5-oxide (II),
3. 8-cyano-6-[p-(propionylamino)phenyl]-4H-s-triazolo[4,3-a][1,4]benzodiazepine 5-oxide (II),
4. 1-benzyl-8-bromo-6-(o-fluorophenyl)-4H-s-triazolo[4,3-a][1,4]benzodiazepine 5-oxide (II),
5. 8-bromo-1-isopropyl-6-[p-(methylsulfinyl)phenyl]-4H-s-triazolo[4,3-a][1,4]benzodiazepine 5-oxide (II),
6. 7,8-bis(diethylamino)-1-methoxymethyl-6-(o-propylphenyl)-4H-s-triazolo[4,3-a][1,4]benzodiazepine 5-oxide (II),
7. 1-aminomethyl-7,8-dibromo-6-(p-propoxyphenyl)-4H-s-triazolo[4,3-a][1,4]benzodiazepine 5-oxide (II),
8. 10-trifluoromethyl-8-ethyl-6-(p-iodophenyl)-1-methyl-4H-s-triazolo[4,3-a][1,4]benzodiazepine 5-oxide (II),
9. 7,9-dichloro-1,6-diphenyl-10-trifluoromethyl-4H-s-triazolo[4,3-a][1,4]benzodiazepine 5-oxide (II),
10. 1-cyanomethyl-9,10-diethyl-6-(o-propylphenyl)-4H-s-triazolo[4,3-a][1,4]benzodiazepine 5-oxide (II),
11. 8-bromo-7-methyl-6-(m-propoxyphenyl)-4H-s-triazolo[4,3-a][1,4]benzodiazepine 5-oxide (II),
12. 8,9-difluoro-1-phenyl-6-(o-methylphenyl)-10-trifluoromethyl-4H-s-triazolo[4,3-a][1,4]benzodiazepine 5-oxide (II),
13. 10-chloro-8-ethyl-6-(o-ethylphenyl)-1-piperidinomethyl-4H-s-trizolo[4,3-a][1,4]benzodiazepine 5-oxide (II),
14. 8-bromo-6-(2,4-difluorophenyl)-1-ethoxymethyl-9-ethyl-4H-s-triazolo[4,3-a][1,4]benzodiazepine 5-oxide (II),
15. 9-trifluoromethyl-7-ethyl-6-(p-fluorophenyl)-1-(methylamino)methyl-4H-s-triazolo[4,3-a][1,4]benzodiazepine (II), etc.

Example 4 4-acetoxy-8-chloro-1-methyl-6-phenyl-4H-s-triazolo[4,3-a][1,4]benzodiazepine (I)

A stirred mixture of 2.39 g. (0.00734 mole) of 8-chloro-1-methyl-6-phenyl-4H-s-triazolo[4,3-a][1,4]benzodiazepine 5-oxide (II) (prepared as in Example 1 or 3), 11.8 ml. of acetic anhydride and 7 ml. of acetic acid is warmed on a steam bath, under nitrogen, for about 30 minutes and concentrated under vacuum. The residue is suspended in water, neutralized to about pH 7 with dilute sodium carbonate solution and extracted with methylene chloride. The extract is dried with potassium carbonate and concentrated. Crystallization of the residue from ethyl acetate gives 0.96 g. (36 percent yield) of 4-acetoxy-8-chloro-1-methyl-6-phenyl-4H-s-triazolo[4,3-a][1,4]benzodiazepine (I), having a melting point of 233.5° to 235° C. A second crop of 0.55 g. melting at 225° to 227° C. is also obtained. The analytical sample is crystallized from a mixture of ethyl acetate and Skelly solve B (hexanes) and has a melting point of 235.5° to 236.5° C.; ultraviolet (ethanol) λmax. 223 mμ ($\epsilon$=38,300), inflections at 248 mμ($\epsilon$=13,750), 270 mμ ($\epsilon$=6,850), 290 mμ ($\epsilon$=4,100); infrared (Nujol) absorption at 1730 cm$^{-1}$ (C = 0). The nuclear magnetic resonance spectrum of the compound supports its proposed structure.

Anal. Calcd. for $C_{19}H_{15}ClN_4O_2$:  C, 62.21; H, 4.12; Cl, 9.67; N, 15.28.
Found: C, 62.27; H, 4.21; Cl, 9.38; N, 14.79.

Following the procedure of Example 4 but substituting another 4H-s-triazolo[4,3-a][1,4]benzodiazepine 5-oxide (II), such as 1. 1-ethyl-6-phenyl-4H-s-triazolo[4,3-a][1,4]benzodiazepine 5-oxide (II),
2. 8-bromo-6-(2,4-dichlorophenyl)-1-methyl-4H-s-triazolo[4,3-a][1,4]benzodiazepine 5-oxide (II),
3. 8-chloro-6-(p-fluorophenyl)-1-isopropyl-4H-s-triazolo[4,3-a][1,4]benzodiazepine 5-oxide (II),
4. 1-benzyl-7-chloro-6-[p-(methylsulfinyl)phenyl]-4H-s-triazolo[4,3-a][1,4]benzodiazepine 5-oxide (II),
5. 9,10-dimethyl-8-fluoro-6-(o-chlorophenyl)-4H-s-triazolo[4,3-a][1,4]benzodiazepine 5-oxide (II),
6. 7,8-bis(diethylamino)-1-ethoxymethyl-6-(m-methoxyphenyl)-4H-s-triazolo[4,3-a][1,4]benzodiazepine 5-oxide (II),
7. 1-aminomethyl-7,8-dichloro-6-[o-(trifluoromethyl)-phenyl]-4H-s-triazolo[4,3-a][1,4]benzodiazepine 5-oxide (II),
8. 9-trifluoromethyl-7-ethyl-6-(p-methylphenyl)-10-fluoromethyl-4H-s-triazolo[4,3-a][1,4]benzodiazepine 5-oxide (II),
9. 9-chloro-8-ethyl-6-phenyl-1-pyrrolidinomethyl-4H-s-triazolo[4,3-a][1,4]benzodiazepine 5-oxide (II),
10. 10-acetylamino-7,8-dibromo-9-methyl-6-(m-nitrophenyl)-4H-s-triazolo[4,3-a][1,4]benzodiazepine 5-oxide (II), etc., yields, respectively, 1. 4-acetoxy-1-ethyl-6-phenyl-4H-s-triazolo[4,3-a]-[1,4]benzodiazepine (I),
2. 4-acetoxy-8-bromo-6-(2,4-dichlorophenyl)-1-methyl-4H-s-triazolo[4,3-a][1,4]benzodiazepine (I),
3. 4acetoxy-8-chloro-6-(p-fluorophenyl)-1-isopropyl-4H-s-triazolo[4,3-a][1,4]benzodiazepine (I),
4. 4-acetoxy-1-benzyl-7-chloro-6-[p-(methylsulfinyl)-phenyl]-4H-s-triazolo[4,3-a][1,4]benzodiazepine (I),
5. 4-acetoxy-9,10-dimethyl-8-fluoro-6-(o-chlorophenyl)-4H-s-triazolo[4,3-a][1,4]benzodiazepine (I),
6. 4-acetoxy-7,8-bis(diethylamino)-1-ethoxymethyl-6-(m-methoxyphenyl)-4H-s-triazolo[4,3-a][1,4]benzodiazepine (I),
7. 4-acetoxy-1-aminomethyl-7,8-dichloro-6-[o-(trifluoromethyl)phenyl]-4H-s-triazolo[4,3-a][1,4]benzodiazepine (I), 8. 4-acetoxy-9-trifluoromethyl-7-ethyl-6-(p-methylphenyl)-10-trifluoromethyl-4H-s-triazolo[4,3-a][1,4]benzodiazepine (I), 9. 4-acetoxy-9-chloro-8-ethyl-6-phenyl-1-pyrrolidinomethyl-4H-s-triazolo[4,3-a][1,4]benzodiazepine (I), 10. 4-acetoxy-10-acetylamino-7,8-dibromo-9-methyl-6-(m-nitrophenyl)-4H-s-triazolo[4,3-a][1,4]benzodiazepine (I), etc.

Following the procedures of the immediately preceding paragraph and of Example 4, but substituting propionic anhydride and propionic acid for the acetic anhydride and acetic acid employed therein, gives the corresponding 4-propionyloxy counterparts of Formula I. Likewise, the substitution of another organic carboxylic acid (preferably a hydrocarbon carboxylic acid containing from one through three carbon atoms) and the anhydride derived therefrom yields the corresponding 4-acyloxy compound (I), Example 5 8-chloro-1-methyl-6-phenyl-4H-s-triazolo-[4,3-a]]1,4]benzodiazepin-4-ol (I)

A stirred suspension of 2.6 g. of 4-acetoxy-8-chloro-1-methyl-6-phenyl-4H-s-triazolo[4,3-a][1,4]benzodiazepine (I), (prepared as in Example 4) in 130 ml. of 95 percent ethanol is cooled in an ice bath, under nitrogen, and treated dropwise, during a period of 1 hour and 50 minutes, with 7.28 ml. of a 1N sodium hydroxide solution in 26 ml. of water. The solution is kept in the ice bath for an additional hour, poured into ice water, treated with a small volume of brine and extracted with chloroform. The extract is washed with brine, dried with magnesium sulfate and concentrated under vacuum. The residue is crystallized from a mixture of chloroform and ethanol to give 2.2 g. of the ethanol solvate of 8-chloro-1-methyl-6-phenyl-4H-s-triazolo-[4,3-a][1,4]benzodiazepin-4-ol (I), melting at 242° C. (with decomposition). The analytical sample has a melting point of 245.5° to 246.5° C., ultraviolet absorption (ethanol) λmax. 223 mµ (∈=34,150), 246 mµ (inflection, ∈=13,200), 266 mµ (inflection, ∈=6,150275 mµ (inflection, ∈=4,900), 285 mµ (inflection, ∈=3,650), 298 mµ (inflection, ∈=2,050).

Anal. Calcd. for $C_{17}H_{13}ClN_4O \cdot C_2H_5OH$:
C, 61.53; H, 5.16; Cl, 9.56; N, 15.11.
Found: C, 61.68; H, 5.32; Cl, 9.71; N, 14.30; $C_2H_5OH$, 9.25.

Heating the solvate in a desiccator at about 70° C. at 15 mm. Hg for about 72 hours gives pure 8-chloro-1-methyl-6-phenyl-4H-s-triazolo[4,3-a][1,4]benzodiazepin-4-ol (I).

Following the procedure of Example 5 but substituting another 4-acyloxy-4H-s-triazolo[4,3-a][1,4]benzodiazepine (I), such as 1. 4-acetoxy-8-chloro-6-(2,6-difluorophenyl)-1-ethyl-4H-s-triazolo[4,3-a][1,4]benzodiazepine (I), 2. 4-acetoxy-1,8-dimethyl-6-(3-ethyl-4-methoxyphenyl)-4H-s-triazolo[4,3-a][1,4]benzodiazepine (I), 3. 4-acetoxy-9-cyano-1-propyl-6-[p-(trifluoromethyl)-phenyl]-4H-s-triazolo[4,3-a][1,4]benzodiazepine (I), 4. 4-propionyloxy-10-trifluoromethyl-1-(dimethylamino)methyl-6-(m-propoxyphenyl)-4H-s-triazolo[4,3-a][1,4]-benzodiazepine (I), 5. 4-propionyloxy-8-[trifluoromethyl-1-piperidinomethyl-6-(p-nitrophenyl)-4H-s-triazolo[4,3-a][1,4]benzodiazepine (I), 6. 4-propionyloxy-9-(methylmercapto)-1-(methylpropylamino)-ethyl-10-nitro-6-[o-(isopropylsulfonyl)phenyl]-4H-s-triazolo[4,3-a][1,4]benzodiazepine (I), etc., yields respectively, 1. 8-chloro-6-(2,6-difluorophenyl)-1-ethyl-4H-s-triazolo[4,3-a][1,4]benzodiazepin-4-ol (I), 2. 1,8-dimethyl-6-(3-ethyl-4-methoxyphenyl)-4H-s-triazolo[4,3-a][1,4]benzodiazepin-4-ol (I), 3. 9-cyano-1-propyl-6[p-(trifluoromethyl)phenyl]-4H-s-triazolo[4,3-a][1,4]benzodiazepin-4ol (I), 4. 10-trifluoromethyl-1-(dimethylamino)methyl-6-(m-propoxyphenyl)-4H-s-triazolo[4,3-a][1,4]benzodiazepin-4-ol (I), 5. 8-trifluoromethyl-1-piperidinomethyl-6-(p-nitrophenyl)-4H-s-triazolo[4,3-a][1,4]benzodiazepin-4-ol (I), 6. 9-(methylmercapto)-1-(methylpropylamino)ethyl-10-nitro-6-o-(isopropylsulfonyl)phenyl]-4H-s-triazolo-[4,3-a][1,4]benzodiazepin-4-ol (I), etc.

Example 6 8-chloro-1methyl-6-phenyl-4H-s-triazolo-[4,3-a][1,4]benzodiazepin-4-ol (I)

A. 6-chloro-2-hydrazino-4-phenylquinoline

A stirred mixture of 2.7 g. (0.01 mole) of 2,6dichloro-4-phenylquinoline (prepared as in J. Heterocyclic Chem. 3, 359) and 6.8 g. of hydrazine hydrate is refluxed under nitrogen for about 1 hour and concentrated in vacuo. The residue is suspended in warm water, and the solid collected by filtration, dried and recrystallized from ethyl acetate-Skellysolve B (hexanes) to give 1.81 g. (67 percent yield) of 6-chloro-2-hydrazino-4-phenylquinoline of melting point 156.5° to 157.5° C.

Anal. Calcd. for $C_{15}H_{12}ClN_3$:
C, 66.79; H, 4.49; Cl, 13.15; N, 15.58.
Found: C, 67.15; H, 4.65; Cl, 13.19; N, 15.32.

B. 7-chloro-1-methyl-5-phenyl-s-triazolo[4,3-a]-quinoline

A stirred mixture of 1.4 g. (0.0052 mole) of 6-chloro-2-hydrazino-4-phenylquinoline (prepared as in Part A, above), 0.925 g. (0.0057 mole) of triethyl orthoacetate and 100 ml. of xylene is refluxed, under nitrogen, for about 2 hours, 40 minutes. During this period the ethanol formed in the reaction is removed by distillation through a short, glass helix-packed column. The mixture is concentrated to dryness in vacuo and the residue is crystallized from methanol-ethyl acetate to give: 1.02 g. of 7-chloro-1-methyl-5-phenyl-s-triazolo[4,3-a]quinoline of melting point 253.5° to 255° C. and 0.26 g. of melting point 253.5° to 255° C. (83.9 percent yield). The analytical sample is crystallized from methylene chloride:methanol and has a melting point of 252.5° to 253.5° C.

Anal. Calcd. for $C_{17}H_{12}ClN_3$:
C, 69.50; H, 4.12; Cl, 12.07; N, 14.31.
Found: C, 69.39; H, 4.02; Cl, 12.10; N, 14.49.

C. 5-chloro-2-(3-methyl-4H-1,2,4-triazol-4-yl)-benzophenone (D) and 4-(2-benzoyl-4-chlorophenyl)-5-methyl-4H-1,2,4-triazole-3-carboxaldehyde (C)

A stirred suspension of 2.94 g. (0.01 mole) of 7-chloro-1-methyl-5-phenyl-s-triazolo[4,3-a]quinoline (prepared as in Part B, above) and 200 ml. of acetone is cooled in an ice bath and treated, dropwise, during a period of about 15 minutes, with a solution prepared from 200 mg. of ruthenium dioxide, 4 g. of sodium periodate and 35 ml. of water. A slight exothermic reaction is noted and the mixture becomes dark. After about 10 minutes, 29 ml. of solution containing 12 g. of sodium periodate in 70 ml. of water is added during about 10 minutes. This mixture is stirred for about 2 hours and then the 41 ml. of remaining sodium periodate solution is added during the next 3 hours. The mixture is allowed to remain at 4° for 18 hours and is concentrated in vacuo to remove acetone. The resulting aqueous mixture is extracted with methylene chloride. The extract is washed with water, dried over anhydrous magnesium sulfate, and concentrated. The residue is chromatographed on 150 g. of silica gel with 2 percent methanol-98 percent chloroform; 60 ml. fractions are collected. Recovered starting material is eluted in fractions 11–14 and crystallized from methanolmethylene chloride to give 0.069 g. of melting point 251.5° to 235.5° C. A mixture of the two products (C and D) is eluted in fractions 15–39. Crystallization of this mixture from ethyl acetate gives 618 mg. (20.8 percent) of 5-chloro-2-(3-methyl- 4H-1,2,4-triazol-4-yl)benzophenone (D) of melting point 165.5° to 168° C. Crystallization of the mother liquor from methanol gives 0.126 g., melting point 108–112 and 0.588 g. of melting point 101.5° to 105.5° C. (decomposition) (19.9 percent yield) of a methanol solvate of 4-(2-benzoyl-4-chlorophenyl)-5-methyl-4H-1,2,4-triazole-3-carboxaldehyde (C). The analytical sample has a melting point of 100° to 101.5° C.

Anal. Calcd. for $C_{17}H_{12}ClN_3O_2$:  C, 62.68; H, 3.71; Cl, 10.89; N, 12.90.
Found: C, 59.37; H, 4.89; Cl, 9.75; N, 11.30. MeOH, 9.34%; $H_2O$, 0.40%.
Corrected for MeOh and $H_2O$: C, 61.90; H, 4.06; Cl, 10.80; N, 12.52.

Heating the solvate in a desiccator at 70° C. at 15 mm. Hg for 72 hours gives pure 4-(2-benzoyl-4-chlorophenyl)-5-methyl-4H-1,2,4-triazole-3-carboxaldehyde.

D. 8-chloro-1-methyl-6-phenyl-4H-s-triazolo[4,3-a][1,4]benzodiazepin-4-ol (I)

To 25 ml. of 95 percent ethanol (previously saturated with ammonia at room temperature) 0.326 g. (0.001 mole) of 4-(2-benzoyl-4-chlorophenyl)-5-methyl-4H-1,2,4-triazole-3-carboxaldehyde (C) (prepared as in Part C, above) is added. The resulting mixture is stirred for about 5 hours and then concentrated under vacuum at about 25° to 30° C. The residue is crystallized from ethanol to give 0.189 g. of the ethanol solvate of 8-chloro-1-methyl-6-phenyl-4H-s-triazolo[4,3-a][1,4]benzodiazepin-4-ol (I), having a melting point of 238.5° to 239° C. (with decomposition). This material is identical to an authentic sample by infrared, ultraviolet and nuclear magnetic resonance spectroscopic comparison.

Heating the solvate in a desiccator at 70° C. for about 72 hours gives pure 8-chloro-1-methyl-6-phenyl-4H-s-triazolo[4,3-a][1,4]benzodiazepin-4-ol (I).

Following the procedure of Example 6, Part D, but substituting another 4H-1,2,4-triazole-3-carboxaldehyde, such as 1. 4-(2-benzoyl-4,6-dibromophenyl)-5-ethyl-4H-1,2,4-triazole-3-carboxaldehyde (C),
2. 4-(2-benzoyl-3-methylphenyl)-5-propyl-4H-1,2,4-triazole-3-carboxaldehyde (C),
3. 4-(2-benzoyl-3-chloro-5-methylphenyl)5-phenyl-4H-1,2,4-triazole-3-carboxaldehyde (C),
4. 4-[2-(o-bromobenzoyl)-5-ethylphenyl]-5-aminomethyl-4H-1,2,4-triazole-3-carboxaldehyde (C),
5. 4-(2-benzoyl-4-fluoro-6-ethylphenyl)-5-benzyl-4H-1,2,4-triazole-3-carboxaldehyde (C), etc., yields, respectively, 1. 8,10-dibromo-1-ethyl-6-phenyl-4H-s-triazolo-[4,3-a][1,4]benzodiazepin-4-ol (I),
2. 7-methyl-1-propyl-6-phenyl-4H-s-triazolo[4,3-a]-[1,4]benzodiazepin-4-ol (I),
3. 7-chloro-1,6-diphenyl-9-methyl-4H-s-triazolo-[4,3-a][1,4]benzodiazepin-4-ol (I),
4. 1-aminomethyl-6-(o-bromophenyl)-9-ethyl-4H-s-triazolo[4,3-a][1,4]benzodiazepin-4-ol (I),
5. 1-benzyl-10-ethyl-8-fluoro-6-phenyl-4H-s-triazolo-[4,3-a][1,4]benzodiazepin-4-ol (I), etc.

Example 7  8-chloro-5,6-dihydro-1-methyl-6-phenyl-4H-s-triazolo[4,3-a][1,4]benzodiazepin-4-one (IV)

A stirred suspension of 0.341 g. (0.001 mole) of 8-chloro-1-methyl-6-phenyl-4H-s-triazolo[4,3-a][1,4]benzodiazepin-4-ol (I) in 25 ml. of 95 percent ethanol is mixed with 1 ml. of 1N sodium hydroxide solution, at room temperature, under nitrogen, for about 18 hours and then concentrated under vacuum. The residue is mixed with water and extracted with chloroform. The extract is dried with magnesium sulfate and concentrated. The resulting residue is crystallized from a mixture of ethanol and chloroform to give 0.02 g. of 8-chloro-5,6-dihydro-1-methyl-6-phenyl-4H-s-triazolo[4,3-a][1,4]benzodiazepin-4-one (IV) having a melting point of 306.5° to 307.5° C. (with decomposition) and 0.2 g. of the same compound melting at 304° to 306° C. (with decomposition). The analytical sample has a melting point of 308° to 309° C.; ultraviolet (ethanol) has end absorption, λmax. 238 mμ (ε=13,200), 270 mμ (inflection, ε=1850), 280 mμ (inflection, ε=722); infrared absorption (Nujol) at 3250 cm.$^{-1}$, (NH), 1680 cm.$^{-1}$, 1640 cm.$^{-1}$ (C = 0).

Anal. Calcd. for $C_{17}H_{13}ClN_4O$:  C, 62.87; H, 4.03; Cl, 10.92; N, 17.25.
Found: C, 62.75; 62.58; H, 4.35; 4.10; Cl, 11.08; N, 17.14.

Following the procedure of Example 7 but substituting another 4H-s-triazolo[4,3-a][1,4]benzodiazepin-4-ol (I), such as 1. 6-(m-bromophenyl)-7-chloro-1-methyl-4H-s-triazolo-[4,3-a][1,4]benzodiazepin-4-ol (I),
2. 8-chloro-6-(3,5-diethylphenyl)-1-ethyl-4H-s-triazolo[4,3-a][1,4]benzodiazepin-4-ol (I),
3. 7-bromo-9-ethylthio-6-[m-(propylsulfonyl)phenyl]-4H-s-triazolo[4,3-a][1,4]benzodiazepin-4-ol (I),
4. 1-(diethylamino)methyl-6-[o-(trifluoromethyl)phenyl]-9-nitro-4H-s-triazolo[4,3-a][1,4]benzodiazepin-4-ol (I), 5. 8-bromo-6-(3-chloro-6-fluorophenyl)-7-ethyl-1-pyrrolidinomethyl-4H-s-triazolo[4,3-a][1,4]benzodiazepin-4-ol (I),
6. 8-chloro-1-(dipropylamino)methyl-9-methyl-6-(p-ethoxyphenyl)-4H-s-triazolo[4,3-a][1,4]benzodiazepin-4-ol (I),
7. 1-cyanomethyl-8,9-diethyl-6-(m-nitrophenyl)-7-propoxy-4H-s-triazolo[4,3-a]]1,4]benzodiazepin-4-ol (I),
8. 1-benzyl-8,9-dibromo-6-(p-iodophenyl)-4H-s-triazolo[4,3-a][1,4]benzodiazepin-4-ol (I),
9. 9-trifluoromethyl-8-ethyl-6-(o-isopropylphenyl)-4H-s-triazolo[4,3-a][1,4]benzodiazepin-4-ol (I),
10. 10-acetylamino-6-(2-ethyl-4-fluorophenyl)-7-propyl-4H-s-triazolo[4,3-a][1,4]benzodiazepin-4-ol (I), etc., yields, respectively, 1. 6-(m-bromophenyl)-7-chloro-5,6-dihydro-1-methyl-4H-s-triazolo[4,3-a][1,4]benzodiazepin-4-one (IV),
2. 8-chloro-6-(3,5-diethylphenyl)-5,6-dihydro-1-ethyl-4H-s-triazolo[4,3-a][1,4]benzodiazepin-4-one (IV),
3. 7-bromo-5,6-dihydro-9-ethylthio-6-[m-(propylsulfonyl)phenyl]-4H-s-triazolo[4,3-a][1,4]benzodiazepin-4-one (IV),
4. 1-(diethylamino)methyl-5,6-dihydro-6-[o-(trifluoromethyl)phenyl]-9-nitro-4H-s-triazolo[4,3-a][1,4]benzodiazepin-4-one (IV),
5. 8-bromo-6-(3-chloro-5-fluorophenyl)-5,6-dihydro-7-ethyl-1-pyrrolidinomethyl-4H-s-triazolo[4,3-a][1,4]benzodiazepin-4-one (IV),
6. 8-chloro-5,6-dihydro-1-(dipropylamino)methyl-9-methyl-6-(p-ethoxyphenyl)-4H-s-triazolo[4,3-a][1,4]benzodiazepin-4-one (IV),
7. 1-cyanomethyl-8,9-diethyl-5,6-dihydro-6-(m-nitrophenyl)-7-propoxy-4H-s-triazolo[4,3-a][1,4]benzodiazepin-4-one (IV),
8. 1-benzyl-8,9-dibromo-5,6-dihydro-6-(p-iodophenyl)-4H-s-triazolo[4,3-a][1,4]benzodiazepin-4-one (IV),
9. 9-trifluoromethyl-5,6-dihydro-8-ethyl-6-(o-isopropylphenyl)-4H-s-triazolo[4,3-a][1,4]benzodiazepin-4-one (IV),
10. 10-acetylamino-6-(2-ethyl-4-fluorophenyl)-5,6-dihydro-7-propyl-4H-s-triazolo[4,3-a][1,4]benzodiazepin-4-one (IV), etc.

I claim:
1. A compound selected from the group consisting of those represented by the formulas:

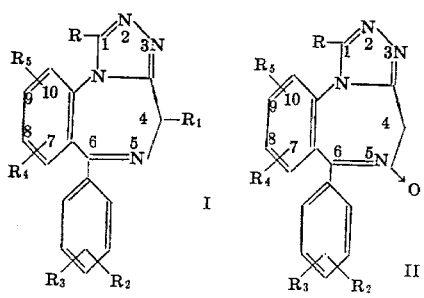

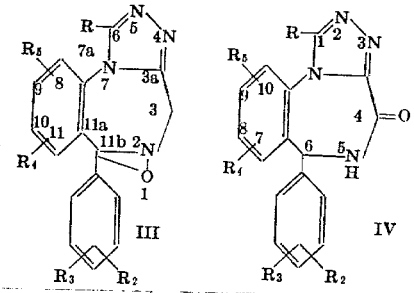

wherein R is selected from the group consisting of hydrogen, lower alkyl of one through three carbon atoms, phenyl, benzyl, nitromethyl, cyanomethyl, lower alkoxymethyl having an alkoxy moiety of one through three carbon atoms;

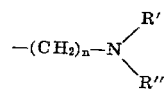

in which $n$ is an integer of 1 through 2, $R'$ and $R''$ are each selected from the group consisting of hydrogen and alkyl of one through three carbon atoms and when combined is an alkylidene bridge of four through five carbon atoms; $R_1$ is selected from the group consisting of hydroxy and lower alkanoyloxy; $R_2$, $R_3$, $R_4$ and $R_5$ are selected from the group consisting of hydrogen, lower alkyl of one through three carbon atoms, halogen, nitro, cyano, trifluoromethyl, lower alkoxy, lower alkylthio, lower alkylsulfinyl, lower alkylsulfonyl, amino, lower alkanoylamino and lower dialkylamino; and a pharmacologically acceptable acid addition salt thereof.

2. A compound of Formula I of claim 1 wherein R is methyl, $R_1$ is hydroxy, $R_2$, $R_3$ and $R_5$ are hydrogen and $R_4$ is 8-chloro, namely, 8-chloro-1-methyl-6-phenyl-4H-s-triazolo-[4,3-a][1,4]benzodiazepin-4-ol.

3. A compound of Formula I of claim 1 wherein R is methyl, $R_1$ is acetoxy, $R_2$, $R_3$ and $R_5$ are hydrogen and $R_4$ is 8-chloro, namely, 4-acetoxy-8-chloro-1-methyl-6-phenyl-4H-s-triazolo-[4,3-a][1,4]benzodiazepine.

4. A compound of Formula II of claim 1 wherein R is methyl, $R_2$, $R_3$ and $R_5$ are hydrogen and $R_4$ is 8-chloro, namely, 8-chloro-1-methyl-6-phenyl-4H-s-triazolo[4,3-a]-[1,4]benzodiazepine 5-oxide.

5. A compound of Formula III of claim 1 wherein R is methyl, $R_2$, $R_3$ and $R_5$ are hydrogen and $R_4$ is 10-chloro, namely, 10-chloro-6-methyl-11b-phenyl-3H,11bH-oxazirino-[3,2-d]-s-triazolo[4,3-a][1,4]benzodiazepine.

6. A compound of Formula IV of claim 1 wherein R is methyl, $R_2$, $R_3$ and $R_5$ are hydrogen and $R_4$ is 8-chloro, namely, 8-chloro-5,6-dihydro-1-methyl-6-phenyl-4H-s-triazolo[4,3-a][1,4]benzodiazepin-4-one.

* * * * *

Notice of Adverse Decision in Interference

In Interference No. 98,161, involving Patent No. 3,681,343, J. B. Hester, Jr., 6-PHENYL - S - TRIAZOLO[4,3-A][1,4]BENZODIAZEPINES, final judgment adverse to the patentee was rendered June 12, 1974, as to claims 2 and 3.

[*Official Gazette October 1, 1974.*]